United States Patent
Graczyk et al.

[11] 3,906,582
[45] Sept. 23, 1975

[54] WINDSHIELD WIPER ARM

[75] Inventors: Bronislaus S. Graczyk, Snyder; William C. Riester, Williamsville, both of N.Y.

[73] Assignee: Trico Products Corporation, Buffalo, N.Y.

[22] Filed: Mar. 14, 1974

[21] Appl. No.: 451,071

[52] U.S. Cl. ............................ 15/250.04; 15/250.04
[51] Int. Cl.² ............................................ B60S 1/46
[58] Field of Search .....................................
15/250.01–250.09

[56] References Cited
UNITED STATES PATENTS

| | | | |
|---|---|---|---|
| 2,925,617 | 2/1960 | Williams | 15/250.04 |
| 3,422,484 | 1/1969 | Carpenter | 15/250.04 |
| 3,427,675 | 2/1969 | Tibbet | 15/250.04 |
| 3,432,876 | 3/1969 | Edwards | 15/250.04 |

*Primary Examiner*—Peter Feldman

[57] ABSTRACT

A windshield wiper arm includes a readily replaceable concealed conduit system for directing washer cleaning fluid from a solvent source to a discharge nozzle affixed to the arm in the blade area. The arm includes a blade carrying section and a mounting head section pivotally attached to the blade carrying section. A cylindrical tube adapter is releasably mounted in a recess of the mounting head section adjacent to a recess for mounting the arm on a pivot shaft. The tube adapter includes an inlet tube connection which extends externally of the arm and an outlet tube connection extending generally in a direction parallel to the longitudinal axis of the arm. A flexible tube from a solvent source is secured to the inlet section and a concealed flexible tube extends from the outlet connection of the tube adapter through the arm to a connection at the discharge nozzle. The recess for the tube adapter includes a keyway. The tube adapter includes a flexible detent arm having a detent formed at the end which engages an aperture in the keyway. The detent arm is receivable in the keyway.

6 Claims, 4 Drawing Figures

US Patent Sept. 23, 1975 3,906,582
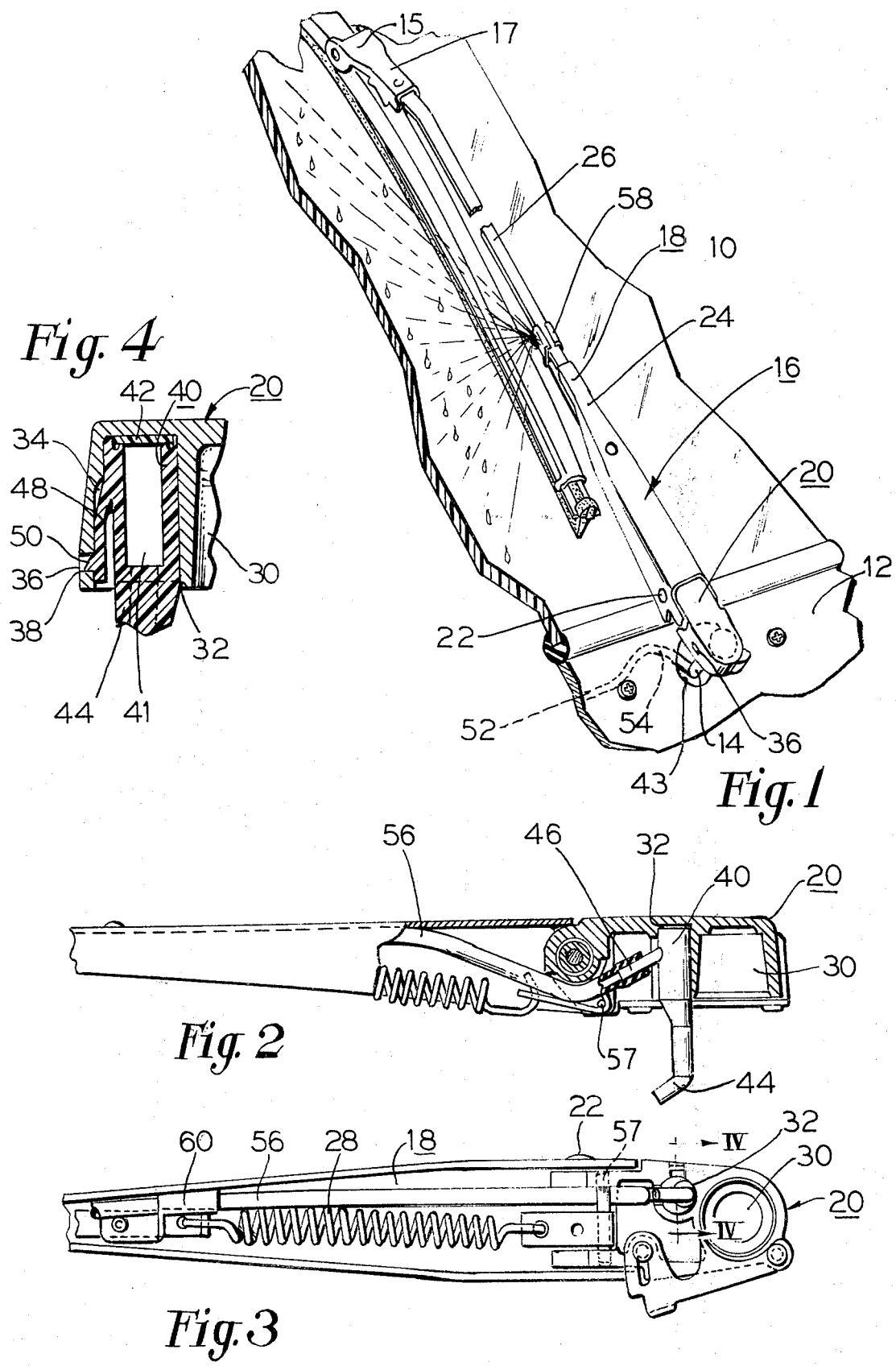

WINDSHIELD WIPER ARM

BACKGROUND OF THE INVENTION

The invention relates to wiper arms having concealed conduit systems for conducting washer solvent through the arm to a discharge nozzle mounted on the arm in the path of the blade and, more particularly, to this type of arm including an improved tube adapter.

Discharge of the washer solvent from a moving arm into the path of the blade rather than from a remotely located nozzle results in better distribution of the solvent in the area where it is utilized and prevents waste of solvent. With a remotely located nozzle the washer solvent may be blown away by the car created windstream or dispersed outside of the wiping path. Because the wiper arm pivots on a transverse axis and also oscillates, it is desirable to use flexible hose for the concealed conduit. It has been found desirable to utilize a rigid or semirigid tube adapter to avoid constrictions of the flexible hose at the sharp bend which occurs at the junction between the portion of the conduit extending along the longitudinal axis of the wiper arm and the portion of the conduit extending from the solvent reservoir or pump to the wiper arm. Various means have been employed to provide this semirigid junction. For example, in U.S. Pat. No. 3,422,484 issued Jan. 21, 1969 to K. H. Carpenter a tubular member having an acute angle bend extends through the mounting head to the outer arm section. The tubular member is resilient and also functions as a biasing spring. In U.S. Pat. No. 3,670,354 issued June 20, 1972 to A. F. Weber, the hose is connected to a pivot shaft having a central opening to act as a fluid conduit. This introduces a complex sealing problem between the wiper arm and the pivot shaft which may result in leakage and corrosion at the junction. U.S. Pat. No. 3,234,579 issued Feb. 15, 1968 to H. R. Roscoe discloses a tube adapter mounted on the pivot shaft; however, to permit relative rotation between the conduit from the source and the conduit from the discharge nozzle the tube connector is made in two pieces, requiring a rotating seal which can be a source of wear and subsequent leakage. In some instances the arm or a portion of the arm is of hollow sealed tubular construction and serves as a conduit as well as a discharge nozzle.

In all of the above examples flexible tubing is used which is subject to wear and weathering; it may be vulnerable to damage and should be readily removable and replaceable. In the constructions shown in the above examples replacement of the flexible tube is difficult. Leakage in the tube may require replacement of the entire arm. A stable conduit system which precludes the possibility of constriction of the flexible conduit, avoids complication of arm installation and removal and requires little change in conventional wiper arm construction is advantageous.

SUMMARY OF THE INVENTION

The present invention utilizes a tube adapter releasably positioned within a recess in the arm which can be readily removed and replaced. Removal of the tube adapter permits simple removal of the flexible tube within the arm and simple replacement thereof. Since the adapter may be of a single piece molded construction, no special sealing is required and no areas vulnerable to leakage are present.

The principal object of the present invention is to provide an improved wiper arm carrying a concealed washer solvent conduit system which is simple to assemble and facilitates replacement of worn or damaged parts.

Another object of the invention is to provide a windshield wiper arm incorporating a conduit system for washer solvent which includes an adapter for the flexible tubes in the conduit system designed to obviate sealing problems when removing or replacing the wiper arm.

A further object of the invention is to provide a windshield wiper arm incorporating a conduit system for washer solvent which precludes constriction of the flexible conduits, permits simple installation and removal of the wiper arm and requires only minor modification of conventional wiper arm construction.

Other objects and advantages of the invention will be apparent from the following detailed description with reference being had to the accompanying drawings.

BRIEF DESCRIPTION OF THE DRAWINGS

FIG. 1 is a fragmentary perspective view of a motor vehicle embodying the invention;

FIG. 2 is a side elevational view, partly in section, illustrating the invention;

FIG. 3 is a bottom elevational view of an arm incorporating the invention; and

FIG. 4 is a transverse cross section taken on line IV—IV of FIG. 3 looking in the direction of the arrows.

DETAILED DESCRIPTION OF THE INVENTION

In FIG. 1 there is shown a portion of a motor vehicle having a windshield 10 and a cowl 12 with a pivot shaft 14 mounted on the cowl 12. Windshield wiper arm 16 is carried on a pivot shaft 14 for oscillation therewith. A windshield wiper blade 15 is carried at the free end of the arm 16 and is pivotally secured thereto by any suitable means as for example bayonet clip 17 as shown. The arm 16 includes a blade carrying section 18 and a mounting head section 20 pivotally secured to the blade carrying section 18 on an axis 22. The blade carrying section includes a spring retainer 24 rigidly secured to an arm extension 26 in any suitable manner as for example by crimping and/or riveting. A biasing spring assembly 28 is disposed within the spring retainer 24 and includes a torsion spring acting between the mounting head 20 and the blade carrying section 18 to bias the blade carrying section toward the windshield 10. The spring biasing assembly is laterally displaced from but parallel to the longitudinal axis of the spring retainer 24 to provide space for the conduit system to be hereinafter described.

The mounting head section includes a first recess 30 for receiving the drive burr portion (not shown) of pivot shaft 14. A second recess 32 adjacent to the first recess 30 is provided in the mounting head; it includes a keyway 34 having an aperture 36 through a wall of the mounting head adjacent the open end of the recess forming a shoulder 38. Disposed within the second recess 32 is a hollow tubular tube adaptor or junction 40 closed at one end 42 having an internal bore 41; it may be of molded plastic material as shown or any other suitable or desirable rigid or semirigid material. At its other end there is provided an inlet tube connection 44 communicating with internal bore 41 and which extends externally of the mounting head 20. The cowl 12 of the vehicle includes an opening 43 shaped to accommodate the depending inlet tube connection 42. The inlet tube connection 44 is located below the cowl 12 to thereby conceal flexible tube or hose 52 extending from a fluid source. This protects the hose 52 from damage and improves the aesthetic appearance of the installation. A generally radially protruding outlet tube connection 46 extends generally in a direction parallel to the longitudinal axis of the wiper arm 16. The wall of the recess 32 has an axial slit to accomodate the outlet tube connection 46. The tube adapter 40 includes a flexible, resilient detent arm 48 terminating in a detent 50 in the form of a lug forming a shoulder at the end of the detent arm. The detent arm 48 is received in the keyway 34 to prevent rotation of the tube adapter 40 relative to the mounting head 20. The detent 50 resiliently engages the shoulder 38 at the opening 36 to prevent longitudinal displacement of the tube adapter 40 and is externally accessible through the aperture 36; it can be flexed to a released position to permit removal of the tube adapter 40 from the recess 32.

A flexible tube 52 extends from a source of washer solvent (not shown) to the inlet tube connection 44, disposed below the cowl 12, of the tube adapter 40 with some slack as shown at 54 to permit oscillation of the wiper arm without strain on the flexible tube 52. A flexible tube 56 extends from the outlet hose connection 46 through the wiper arm spring retainer 24 to a hose connection (not visible) at a discharge nozzle 58 which is mounted on the arm extension 26. The hose 56 passes between the axis 22 and spring hook-plate pin 57; it extends along side the spring assembly 28 and may be retained in position by a holddown bracket 60 and hook-plate pin 57.

A windshield wiper arm has been shown and described which includes a concealed conduit system for washer solvent; it incorporates a removable tube adapter 40 which may be of rigid or semirigid molded plastic or elastomeric material. If it is desired to remove and replace the flexible tube 56 because of damage or wear, the arm may be removed from the pivot shaft and the flexible tube 56 may be disconnected from the inlet tube connection 44. A narrow instrument or thumbnail may be inserted in the aperture 36 of the mounting head to release the detent 50 from engagement with the shoulder 38. Thereupon the tube adapter 40 may be slipped out from the recess 32. The tube connection 46 thus being exposed enables the hose 56 to be readily removed therefrom, and also from the nozzle 58, which itself may be removed from the arm. A replacement tube 56 may then be attached to the tube connection 46, then slipped through the holddown 60 and attached to the nozzle 58, whereupon the tube adapter may be inserted in the recess 32 until the detent 50 engages shoulder 38 of aperture 36. The tube 52 can then be secured to the tube connector 44 and the arm installed on the pivot shaft.

It can be seen that a simple, readily replaceable, stable, concealed conduit system incorporating a readily releasable tube adapter has been provided. The system is stable and precludes constriction of the flexible tubes during installation and operation of the windshield cleaning system. Sealing and leakage problems are avoided. Only minor changes in conventional wiper arm construction are required. No complexity in wiper arm installation and removal is introduced.

Although a specific embodiment of the invention has been shown and described for the purpose of illustration it will of course be apparent that various modifications and other embodiments are possible within the scope of the invention. It is to be understood therefore that the invention is not limited to the specific arrangements shown but in its broadest aspects it includes all equivalent embodiments and modifications which come within the scope of the invention.

What is claimed is:

1. In a windshield cleaning system comprising a wiper arm having a mounting head adapted to be secured to a pivot shaft for movement therewith, a washer fluid discharge nozzle mounted on said wiper arm and a concealed flexible tube for conducting fluid from a fluid source through said arm to said discharge nozzle, a recess located in said mounting head, a tube adapter, having an internal bore, disposed in said recess, means for releasably retaining said tube adapter in said recess, an inlet tube connection communicating with said internal bore extending from said tube adapter and an outlet tube connection communicating with said internal bore positioned within said wiper arm extending from said tube adapter in a direction generally parallel to the longitudinal axis of said wiper arm.

2. A combination according to claim 1 wherein said means for releasably retaining said tube adapter includes a flexible, resilient external detent and a shoulder means in said recess for engagement with said detent.

3. A combination according to claim 2 wherein said recess includes an aperture through a wall thereof accessible externally of said arm portion, an edge of said aperture providing said shoulder means.

4. A combination according to claim 1 wherein said recess includes a keyway having a shoulder formed therein, said means for releasably retaining said tube adapter comprises a flexible resilient arm secured at one end to said tube adapter having a detent formed at its free end, said arm being receivable in said keyway and said detent being releasably engageable with said shoulder whereby said tube adapter is restrained against longitudinal and rotational displacement.

5. A combination according to claim 4 wherein said keyway includes an aperture through said mounting head at said shoulder whereby said detent is externally accessible to effect release thereof to permit removal of said tube adapter from said arm.

6. In a windshield wiper assembly comprising a blade carrying section, a mounting head section pivotally connected to said blade carrying section adapted to be secured to a pivot shaft, a washer solvent discharge nozzle mounted on said blade carrying section and a spring biasing assembly acting between said mounting head section and said blade carrying section to bias said blade carrying section toward a surface to be wiped; said mounting head section including a first recess for receiving a pivot shaft, a second recess adjacent said first recess, said second recess including a keyway, an aperture in said keyway forming an externally accessible shoulder, a tube adapter having a bore closed at an end disposed in said second recess having inlet and outlet tube connections communicating with said bore, a flexible resilient detent arm terminating in a detent secured at one end to said tube adapter and engaged in said keyway, said detent releasably engaging said shoulder and a flexible tube extending from said outlet tube connnection to said discharge nozzle.

\* \* \* \* \*